Figure 1:
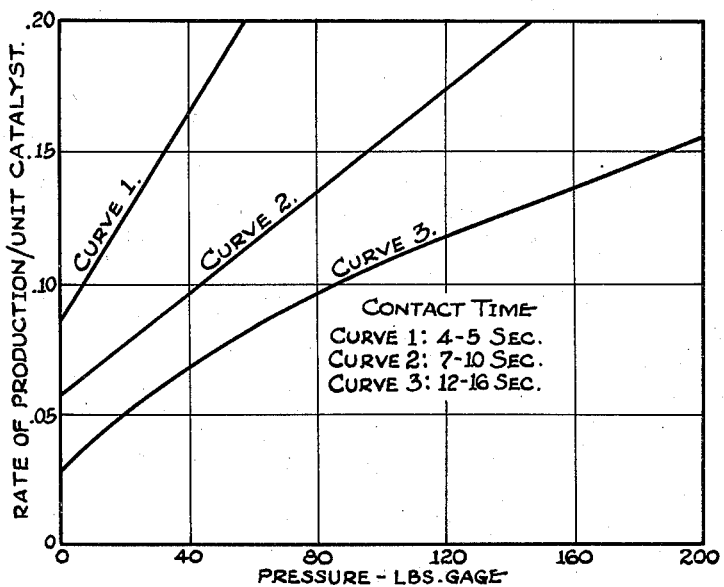

Patented Oct. 10, 1950

2,524,848

UNITED STATES PATENT OFFICE 2,524,848

PROCESS

Eldon E. Stahly and Ben B. Corson, Pittsburgh, Pa., assignors to Koppers Company, Inc., Pittsburgh, Pa., a corporation of Delaware Application July 13, 1946, Serial No. 683,326

3 Claims. (Cl. 260—681)

This invention relates to the manufacture of butadiene from alcohol and has for its principal objects to increase the rate of production of butadiene per unit catalyst, to obtain improved ultimate yields of butadiene, to avoid the disadvantages of the prior art and to obtain advantages as will become apparent as the description proceeds.

These objects are accomplished in the present invention by subjecting a mixture of acetaldehyde and alcohol in the vapor phase in the proportion of 2 to 3 moles of alcohol for each mole of acetaldehyde to the action of a tantalum oxide-activated silica catalyst at a temperature between 300° and 400° C. and at a pressure between 2 and about 10 atmospheres while maintaining a rate of throughput greater than that optimum for atmospheric pressure operation and directly proportional to the pressure in accordance with the following function: $(0.5-2) PR_{ap}$, where P is the pressure in atmospheres and $R_{ap}$ is the optimum rate of throughput for atmospheric pressure; that is to say, the rate which gives the optimum ultimate yield.

It has been thought that operation at superatmospheric pressure in butadiene manufacture from alcohol was unfeasible due to excessive carbon deposition on the catalyst and reduced conversion efficiency. We have now found to the contrary that unexpected advantages may be obtained through vapor phase operation at superatmospheric pressure provided a proper correlation between the rate of throughput and the pressure is maintained. The operating temperatures will be sufficiently above the critical temperature of alcohol and acetaldehyde so that a vapor phase reaction obtains even at the pressures involved. The contact time accordingly will vary directly with the pressure at a given temperature and feed rate. Thus, by increasing the throughput so that the contact time is not materially increased, an increased rate of production per unit catalyst directly proportional to the increased pressure is obtained without excessive deposition of carbon on the catalyst.

In the operation of any butadiene plant depending upon the particular equipment, the particular catalyst, the particular condition, etc. a particular rate of throughput will be found to be optimum for the particular plant. While other factors may have some effect in determining the optimum rate of throughput, the ultimate yield is the dominant one and for the purposes of the present invention is the only one which need be considered. The ultimate yield is determined as the percentage of the raw material which appears as ultimate product. This varies as a function of the rate of throughput, all other factors being held constant, increasing up to the optimum rate of throughput and thereafter decreasing. Those skilled in the art are readily able to determine the optimum rate of throughput for any particular plant.

In order to obtain increased production of butadiene per unit catalyst per hour in accordance with the present invention, the pressure is raised to 2 or more atmospheres but not above the critical pressure and the rate of throughput increased as required to maintain the contact time substantially the same as that optimum for atmospheric pressure operation. The rate of throughput is measured as volume of liquid fed per volume of catalyst per hour. It follows therefore that if the rate of throughput were maintained constant the contact time would increase proportionately to increases in pressure. It is necessary, therefore, in accordance with the invention to increase the rate of throughput proportionately to the increase in the pressure. The optimum rate of throughput in accordance with the invention is determined as approximately X times the optimum rate of throughput for atmospheric pressure operation where X is 0.9 times the pressure in atmospheres. However, just as it is practical to carry out atmospheric pressure operation with the rate of throughput somewhat more or somewhat less than the optimum rate of throughput so it is possible to have corresponding variations in the processes according to the invention. The rate of throughput, however, should be greater than the optimum rate of throughput for atmospheric pressure operation for all pressures and the permissible variation is satisfactorily determined when X is 0.5 to 2 times the pressure in atmospheres. Thus the rate of throughput is determined by the function $(0.5-2) PR_{ap}$, where P is the pressure in atmospheres and $R_{ap}$ is the optimum rate of throughput for atmospheric pressure operation. To put it another way, the ratio of the rate of throughput at superatmospheric pressure to the optimum rate of throughput for atmospheric pressure, though preferably substantially equal to 0.9 times the pressure in atmospheres, may vary from 0.5 to 2 times the pressure in atmosphere.

Still further advantages are obtained in accordance with the invention by operating within the pressure range of from 2 to about 10 atmospheres. By operating within this pressure range we obtain not only the desired increase in the rate of production per unit catalyst, but do so without sacrificing ultimate yields. As a matter of fact within this pressure range we are able to obtain somewhat better yields than are obtainable in atmospheric pressure operation. This is contrary to predictions based on the physical-chemical law of Le Chatelier.

The effect of increased pressure on the rate of production per unit catalyst is shown in Figure 1. In determining these curves, a 3 to 1 ratio of alcohol to aldehyde feed was passed at a temperature of 325°–330° C. and at rates of throughput calculated to give the indicated contact time over a silica gel catalyst activated with 2% tantalum oxide ($Ta_2O_5$). The optimum contact time is about 5 seconds, which corresponds to a rate of throughput of about 0.6 volume per volume of catalyst per hour at atmospheric pressure.

It is to be seen from these curves that a marked increase in the rate of production per unit catalyst is obtained with increased pressure and that the effect is greatest when the rate of throughput is increased in proportion to the increased pressure to maintain the optimum contact time (curve 1).

Figure 2:
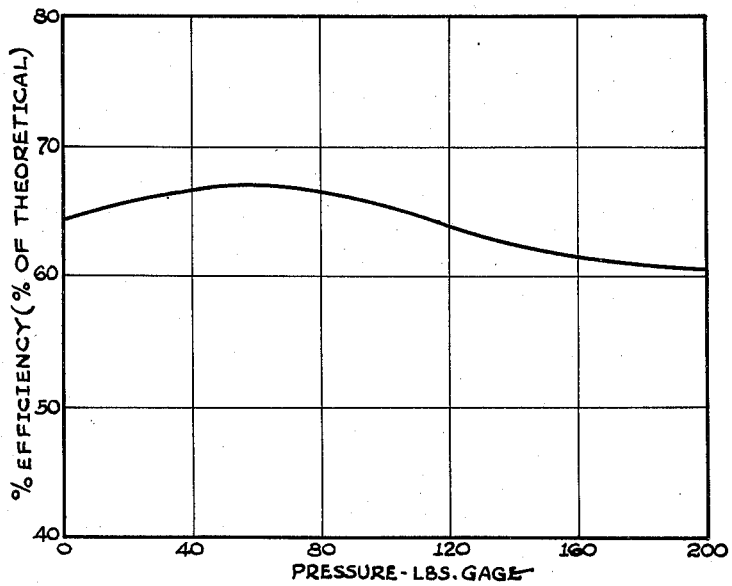

In Figure 2 there is illustrated the relationship between ultimate yield or efficiency and pressure. The curve is based upon data obtained by passing at a temperature of 325° C. at the indicated pressure and at a rate of throughput calculated to give a contact time of 7–10 seconds, a 3 to 1 mole ratio alcohol aldehyde feed over a silica gel catalyst activated with 2% tantalum oxide. It will be observed that the peak of optimum efficiency occurs between about 30 and 100 lbs., roughly between about 2 and 7 atmospheres, and that a reverse in slope begins about at 140 or 150 lbs., roughly 10 atmospheres. Thus it is possible in accordance with the invention to operate between 2 and 10 atmospheres without substantial loss of efficiency and to operate between 2 and 7 atmospheres with a gain in efficiency.

Under the particular conditions of our process, i. e., operation at pressures between 2 and 10 atmospheres at the specified rates of throughput, we have found that the best results are obtainable with feed ratios between 2 and 3 moles of alcohol for each mole of aldehyde and at temperatures between 300 and 400° C.

We claim:

1. In a process for the manufacture of butadiene by subjecting a mixture of alcohol and acetaldehyde in the vapor phase to a butadiene-forming catalyst the steps of subjecting a mixture of alcohol and acetaldehyde in the proportion of 2 to 3 moles of alcohol for each mole of acetaldehyde to the action of a tantalum oxide-activated silica catalyst at a temperature between 300° and 400° C. and at a pressure between 2 and about 10 atmospheres while maintaining a rate of throughput greater than that optimum for atmospheric pressure operation and directly proportional to the pressure in accordance with the following function: $(0.5-2)$ $PR_{ap}$, where P is the pressure in atmospheres and $R_{ap}$ is the optimum rate of throughput for atmospheric pressure.

2. The process of claim 1 in which the function is $0.9 PR_{ap}$.

3. The process of claim 2 in which the pressure is between 2 and 7 atmospheres.

ELDON E. STAHLY.
BEN B. CORSON.

REFERENCES CITED

The following references are of record in the file of this patent:

UNITED STATES PATENTS

| Number | Name | Date |
|---|---|---|
| 2,371,848 | Schulze | Mar. 20, 1945 |
| 2,374,433 | Ipatieff | Apr. 24, 1945 |
| 2,421,361 | Toussaint et al. | May 27, 1947 |